INVENTOR.
GAIL G. GRIGSBY
BY
ATTORNEY

United States Patent Office 2,958,502
Patented Nov. 1, 1960

2,958,502

DIFFERENTIAL SCREW ACTUATED PINCH VALVE

Gail G. Grigsby, Desloge, Mo.

Filed Aug. 30, 1954, Ser. No. 452,820

13 Claims. (Cl. 251—8)

This invention pertains to a valve of the type known as pinch valve in which a section of rubber hose is located between clamping members, the valve being closed by moving the clamping members together to pinch the hose section.

An object of this invention is to provide a simple structure for such a valve.

Another object is to provide a valve structure which will be capable of absorbing the stresses due to expansion and contraction in the pipe line to which the valve is connected.

Another object is to provide means automatically positioned when the valve is open to support the hose section against collapse under external pressure when the interior is subjected to suction.

Generally stated, the valve comprises a frame in which a flexible hose section is mounted. Such hose section is usually formed with diametrically opposite grooves extending along the wall thereof to facilitate folding of the wall and preventing undue stress in the outer elements thereof when the hose is pinched. A valve structure is mounted on the frame, and has upper and lower clamping members with means for moving them toward each other to pinch the hose. Mounted on said clamping members are pivoted links located on opposite sides of the hose. Said links move inward toward the hose when the clamp members are separated so as to be positioned close to the outer walls of the hose to support them against outward movement, which would result from any tendency for the hose to collapse under suction. As the clamp members are moved toward each other, these pivoted links move outward at their central portions to clear the hose as it spreads under the pinching action of the clamp.

A preferred embodiment of this invention is illustrated in the accompanying drawings, in which—

Fig. 4 is a similar end view with the valve closed.

Figure 1:
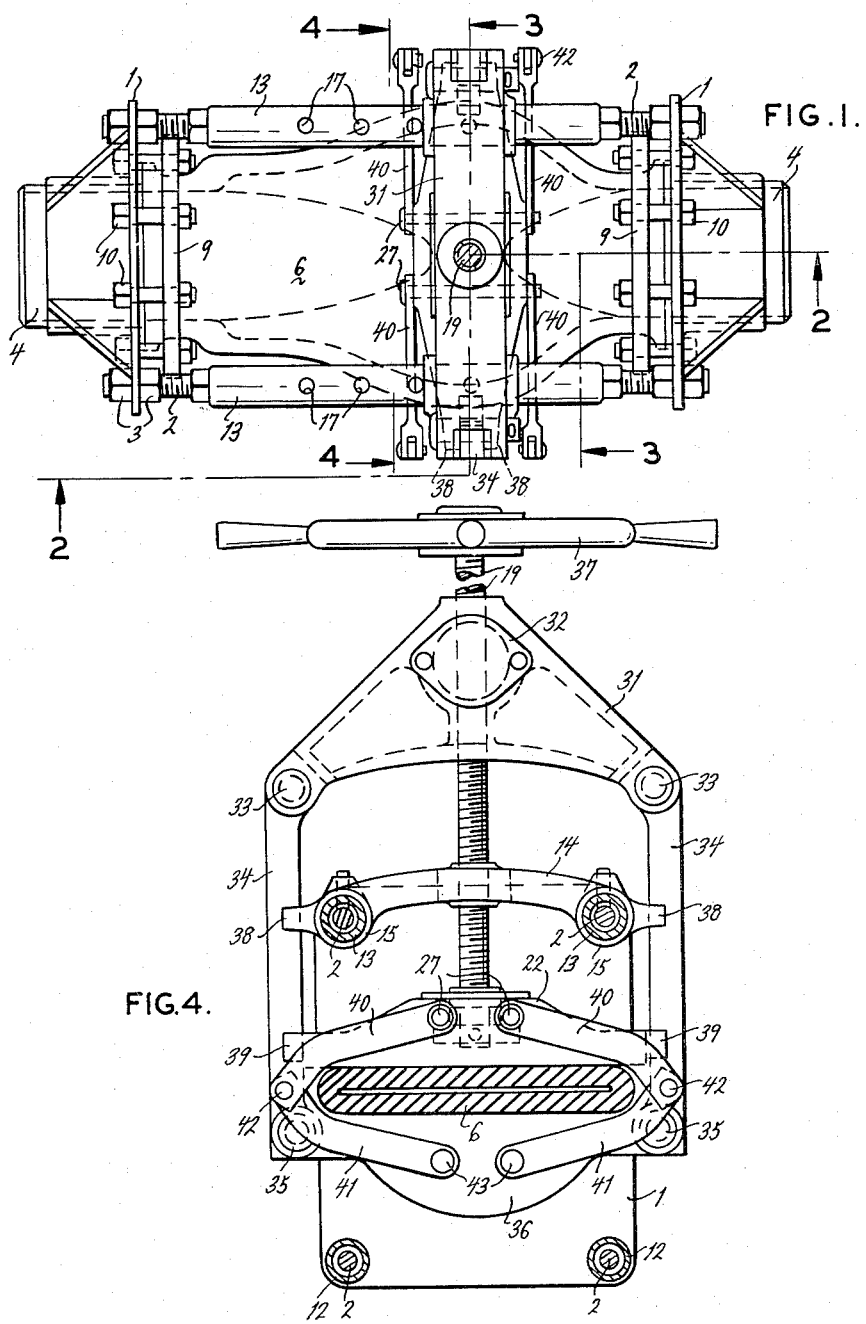
Fig. 1 is a plan view with parts in section of a valve embodying this invention in the position in which the valve is closed.
Figure 2:
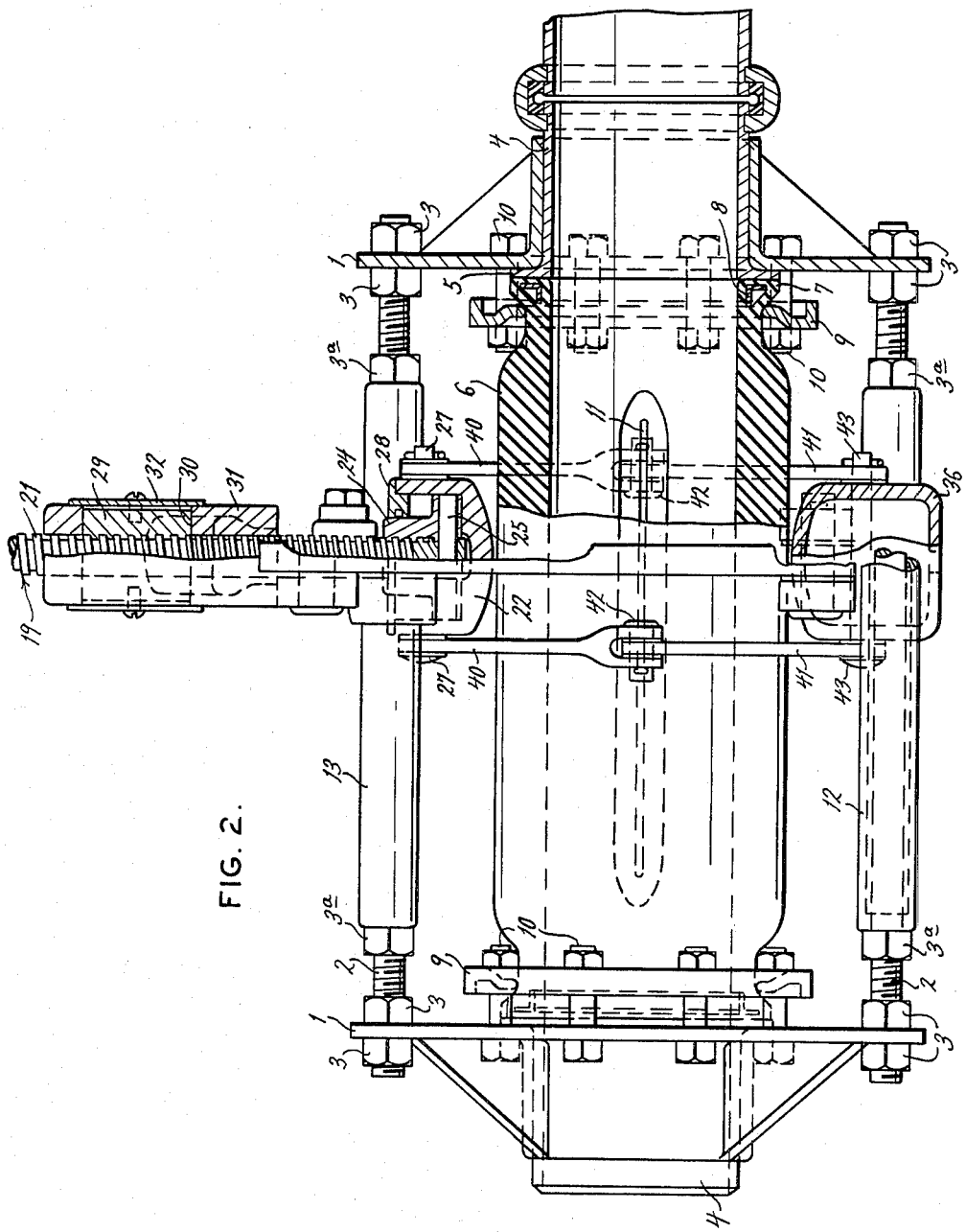
Fig. 2 is a side elevation with parts thereof shown in section on line 2—2 of Fig. 1, and shown with the valve in its open position.
Figure 3:
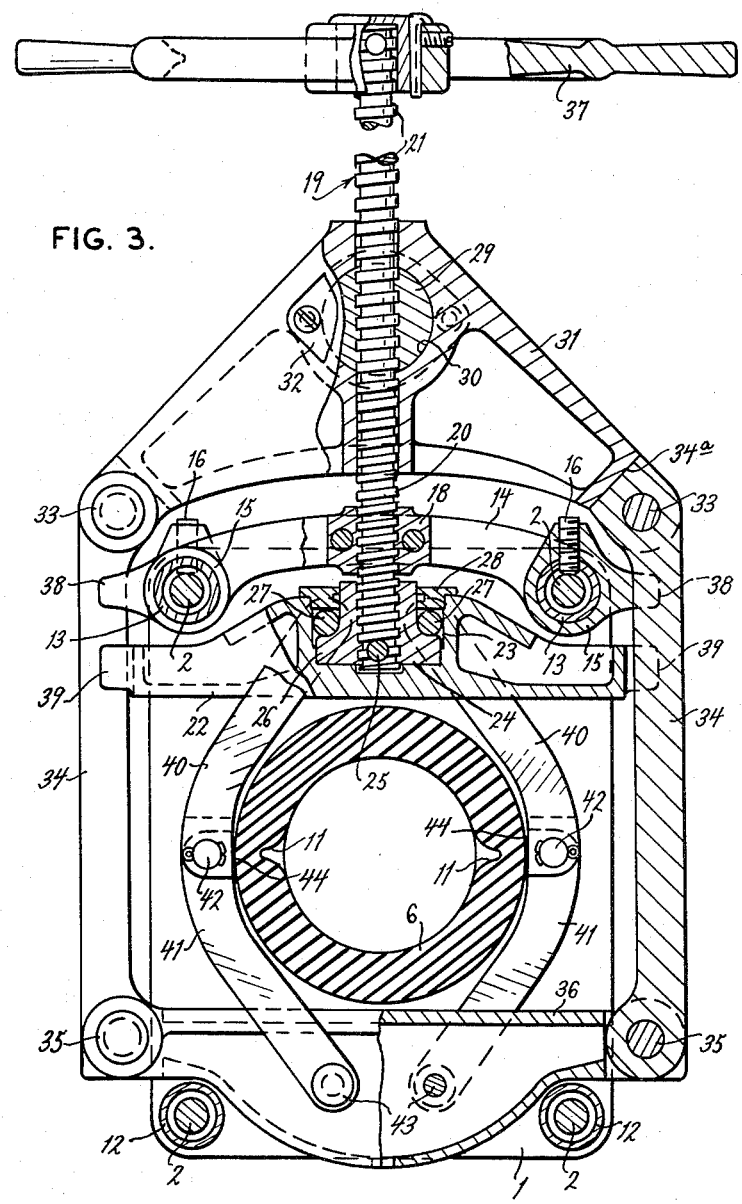
Fig. 3 is a left hand end view of Fig. 2 with parts in section on line 3—3 of Fig. 1 with the valve in open position.

Referring now to the drawings, the valve is supported by a frame consisting of front and rear end plates 1, rigidly held in spaced relation to each other by bolts 2 extending from one to the other and secured thereto by nuts 3. Mounted in each end plate is a connecting bushing or nipple 4 having a radial flange 5 bearing against the inner face of the end plate. A collapsible hose section 6 of rubber or other suitable material is formed of generally cylindrical shape and provided with connecting flanges 7 adapted to bear against the flanges 5 as shown in Fig. 2. These flanges may have molded therein stiffening rings 8 of any suitable cross-section. Each of the flanges 7 is clamped to the end plate by means of a clamping ring 9 secured by clamp bolts 10. Such a hose section is ordinarily formed with internal grooves 11 extending therealong at diametrically opposite points as indicated in Fig. 3. This reduces the thickness of the hose wall at those points where it must bend sharply under the action of the clamp. The nipples 4 are connected by a suitable coupling, or otherwise, to the pipe line.

The bolts 2 are enclosed for the larger portion of their length between the end plates 1 by tubular sleeves 12 and 13. The bolts 2 are threaded far enough to receive nuts 3a which are turned against the ends of the sleeves 12 and 13 so as to put those sleeves under endwise compression, the bolts sustaining corresponding tension. This arrangement forms a set of stiff braces adapted to hold the end frames 1 rigidly in alignment with each other. At the same time, these sleeves provide stiff columns adapted to take up any end thrust which may be applied to the frame as a whole by the pipe line sections connected to the nipples 4. Ordinary expansion and contraction of the pipe line with changes of temperature may subject the frame to considerable stress. This arrangement of the sleeves provides stiff strut members between the end frames adapted to insure against buckling of the rods 2 under compressive stress.

This structure also provides for holding the end frames in position when it is necessary to replace the hose section 6. The nuts 3 may be manipulated to move the end frames 1 in one direction or another so as to slack off any stress in the hose section 6 prior to removing the same. This adjustment also holds the frames in proper position to make it easy to install a new hose section.

The sleeves 12 and 13 also serve as guides to keep the clamp structure from moving laterally to distort the hose section. Movably mounted on the upper two sleeves 13 is a clamp support 14 having a generally bridge-shaped structure as shown in Fig. 3 provided at its ends with cylindrical portions 15 bored to receive the sleeves 13. This clamp support is thus slidably mounted on said sleeves so that it may be moved to different positions therealong. Each of the cylindrical portions 15 has a set screw 16 threaded therein, and the sleeves 13 are provided with spaced holes 17 adapted to receive the set screws 16 which thus serve to secure the support 14 in different positions along the sleeves 13.

The support 14 is also provided at its middle point with a nut portion 18 into which is threaded a clamp screw indicated generally at 19. Said screw is provided at different portions of its length with threads of different pitch. The lower portion has a thread 20 of lesser pitch, and the upper portion a thread 21 of greater pitch.

Mounted on the lower end of the screw 19 is an upper clamp member 22 having a central socket 23 into which is loosely fitted a nut 24 on the end of the screw 19, said nut being secured to said screw by a crosspin 25. The nut 24 has a lower flange 26 loosely fitted in the socket 23 so that it may rotate therein. Said nut is retained in said socket by crosspins 27 which also serve as pivot pins, as will be described later. A cap 28 may be provided as a closure for the socket 23, which may contain lubricant for the moving parts therein.

Threaded on the upper thread 21 of the screw 19 is a nut 29 in the form of a short cylinder through which the thread opening passes at right angles to its axis. This nut is housed in a socket 30 formed in a yoke 31 and secured therein by cover plates 32. The yoke 31 has secured thereto by pins 33 a pair of links 34 extending downward, one on each side of the hose section 6. The lower ends of the links 34 have connected thereto by means of pins 35 a lower clamp member 36 extending across the frame below the hose section 6.

It will be seen that the upper clamp member 22 is supported on the end of the screw 19 which is supported by its thread connection with the nut portion 18 of the support 14. Assuming that the two different screw pitches 20 and 21 bear the relation to each other of 1 to 2, respectively, this provides a differential screw. If the pitch of the thread 20 is ⅛" and that of the thread 21, ¼", when the screw is rotated by means of a hand wheel 37 secured to the upper end thereof, the screw will move downward with reference to the support 14 at the rate of ⅛" per revolution, and the upper clamp 22 will move downward therewith at the same rate. At the same time, the nut 29 and the yoke 31 supported thereby will be moved upward by rotation of the screw at the rate of ¼" per revolution with respect to the screw. This yoke supports the lower clamp 36 which is therefore moved upward with respect to the screw 19 at the rate of ¼" per revolution, while the screw itself moves downward at the rate of ⅛" per revolution, the result being that the clamp 36 moves upward with respect to the hose section at the rate of ⅛" per revolution, the result being that the clamp 36 moves upward with respect to the hose section at the rate of ⅛" per revolution while the upper clamp 22 moves downward with respect to said hose section at the same rate. Accordingly, the two clamp members will move toward the center of the hose section at the same rate so that said section will be pinched equally from top and bottom so that its final collapsed position, as shown in Fig. 4, will be coaxial with its open position, as shown in Fig. 3. The support 14 is formed with lugs 38 extending on both sides of the link 34 so as to guide that link in its up-and-down movement. Similarly, the upper clamp member 22 has similar lugs 39 extending on opposite sides of the links so as to guide said clamp member 22.

It will be noted that the links 34 are each formed with a squared end 34a arranged to abut a complementary shoulder on the yoke 31, as may be seen from Fig. 3. This prevents the link 34 from pivoting on the pin 33 and therefore prevents side sway of the lower clamp 36 with respect to the upper clamp and the yoke 31.

Pivoted on the pins 27 at both ends of each are links 40, the lower ends of which are forked as shown in Fig. 2, to receive the upper ends of links 41 pivoted to the links 40 by pins 42. The lower ends of the links 41 are pivoted by pins 43 to the lower clamp member 36. The mutually connected ends of the links 40 and 41 have flattened portions indicated at 44 in Fig. 3, which, when the valve is in open position, are positioned close to the sides of the hose, as shown in Fig. 3. Accordingly, if the hose should be subjected to suction and should tend to collapse, that tendency would cause it to spread laterally, as seen in Fig. 3, since the grooves 11 are the most flexible parts thereof. This tendency to spread is therefore opposed by the abutments 44 provided by the links 40 and 41. When the valve is closed, these links pivot on the clamp members and relatively to each other, and move to the position of Fig. 4, in which they clear the ends of the pinched portion of the hose, and therefore, do not interfere with the action of the clamps.

It will be seen, therefore, that this invntion provides a simple structure for mounting such a pinch valve. The frame is of simple construction and very rigid. The hose section is easily mounted therein, and when worn, may be renewed by simply releasing the clamp rings 9. The clamp is so arranged that by the simple differential action of the screw 19, the clamp members move toward each other at the same rate from above and below, so that the hose is pinched without lateral or vertical distortion. When in the open position, the hose is supported against collapse by the atmospheric pressure when the interior is subjected to suction. By moving the support 14 from point to point along the sleeves 13, the clamping action can be moved along the hose section so as to avoid undue wear at any one position.

Various changes may be made in the details of construction, within the scope of the appended claims, without departing from the spirit of this invention. Parts of the invention may be used without the whole and improvements may be added while retaining some or all of the advantages of the invention.

I claim:

1. In a pinch valve of the character described having a frame, a hose section supported in said frame, said hose having oppositely positioned longitudinally inside grooves to facilitate collapsing the same, and clamps movable against said hose to pinch the same, the improvement comprising, a plurality of supporting means one of which being positioned closely adjacent the hose adjacent each said groove therein to support the hose against outward movement, and connections between each said supporting means and each of said clamps operating to move the same outward from the hose upon collapsing movement of the clamps.

2. In a pinch valve of the character described having a frame, a hose section supported in said frame, said hose having oppositely positioned longitudinal inside grooves to facilitate collapsing the same, and clamps movable against said hose to pinch the same, the improvement comprising, a pair of link assemblies each including supporting links pivoted one to each of said clamps and to each other between said clamps, said links of one link assembly being dimensioned and positioned so that their mutually pivoted portions are closely adjacent the hose adjacent each said groove when the clamps are separated so as to support the hose against outward movement, said mutually pivoted portions moving outward from the hose when the clamps are moved toward each other.

3. In a pinch valve of the character described, a frame, a collapsible hose section supported in said frame, the hose section having oppositely positioned longitudinal inside grooves to facilitate collapsing the hose section, a pair of supporting bars mounted in said frame longitudinally of said hose section, clamping means operable to collapse said hose and mounted for movement to different positions on said bars, a plurality of supporting means one of which being positioned closely adjacent the hose adjacent each groove therein to support the hose against outward movement, and connections between each supporting means and said clamping means operating to move the supporting means outwardly from the hose upon collapsing movement of the clamping means.

4. In a pinch valve of the character described, a frame, a collapsible hose section supported in said frame, the hose section having oppositely positioned longitudinal inside grooves to facilitate collapsing the hose section, a pair of supporting bars mounted in said frame longitudinally of said hose section, clamping means operable to collapse said hose and movably supported on said bars, means spaced along one of said bars engageable to fix the location of said clamping means thereon, a plurality of supporting means one of which being positioned closely adjacent the hose adjacent each groove therein to support the hose against outward movement, and connections between each supporting means and said clamping means operating to move the supporting means outwardly from the hose upon collapsing movement of the clamping means.

5. In a pinch valve of the character described, a frame, a collapsible hose section supported in said frame, the hose section having oppositely positioned longitudinal inside grooves to facilitate collapsing the hose section, a pair of supporting bars mounted in said frame longitudinally of said hose section, a pair of clamps mounted for movement to different positions on said bars, a plurality of hose-supporting means one of which being positioned closely adjacent the hose adjacent each groove to support the hose against outward movement, and connections between each said hose-supporting means and each of said clamps operating to move said supporting means outward upon collapsing movement of the clamps.

6. In a pinch valve of the character described, a frame, a collapsible hose section supported in said frame, the hose sections having oppositely positioned longitudinal inside grooves to facilitate collapsing of said hose section, a pair of supporting bars mounted in said frame longitudinally of said hose section, a pair of clamps movably supported on said bars, a plurality of hose-supporting means one of which being positioned closely adjacent the hose adjacent each groove to support the hose against outward movement, connections between each said hose-supporting means and each of said clamps operating to move said supporting means outward upon collapsing movement of the clamps, and means spaced along one of said bars engageable to fix the location of said clamps therealong.

7. In a pinch valve of the character described having a frame and a collapsible hose section supported in said frame; the hose section having oppositely positioned longitudinal inside grooves to facilitate collapsing of said hose section, a clamp support mounted on the frame, a pair of clamps arranged to pinch said hose, a differential screw interconnecting said clamps and said support and operable to move said clamps simultaneously at substantially the same rate toward the center of the hose to clamp the same, and a plurality of supporting elements mounted on said clamps, one of said supporting elements being positioned to support the hose adjacent each groove against outward movement when the clamps are separated and movable outward to clear the hose when the clamps are moved toward each other to clamp the hose.

8. A pinch valve of the character described, comprising, a pair of end frames each provided with a pipe nipple attachable to a pipe line, a plurality of threaded brace rods extending between said frames and adjustably secured thereto, bracing sleeves surrounding said rods for a major portion of their lengths, nuts on said rods adjustable to supply endwise pressure to said sleeves, whereby said frames are rigidly fixed in alignment and spaced apart, a flexible hose section connecting said nipples between said frames, the hose section having oppositely positioned longitudinal inside grooves to facilitate collapsing of said hose sections, a hose-pinching clamp mounted on certain of said bracing sleeves, and a plurality of supporting means one of which being positioned closely adjacent the hose section adjacent each groove to support the hose section against outward movement, and connections between each supporting means and said clamp operating to move the supporting means outwardly from the hose section upon collapsing movement of the clamp.

9. In a pinch valve of the character described, a pair of end frames, a plurality of threaded brace rods extending between said frames and adjustably secured thereto, bracing sleeves surrounding said rods for a major portion of their lengths, nuts on said rods adjustable to supply endwise pressure to said sleeves, whereby said frames are rigidly fixed in alignment and spaced apart, a flexible hose section mounted between said frames, the hose section having oppositely positioned longitudinal inside grooves to facilitate collapsing of the hose section, a hose-pinching clamp mounted on certain of said sleeves for movement to different positions thereon, means on one of said clamp-mounting sleeves to fix the position of said clamp relative to said hose section, and a plurality of supporting means one of which being positioned closely adjacent the hose section adjacent each said groove to support the hose section against outward movement, and connections between each said supporting means and said clamp operating to move the supporting means outwardly from the hose section upon collapsing movement of said clamp.

10. In a pinch type valve, the combination comprising a flexible tubing member, means for holding the respective ends of said tubing member in fluid-tight relationship to a conduit adapted to receive and discharge fluid therefrom and to a conduit adapted to supply fluid thereto, a pair of opposed, valve-closing pinch members mounted upon opposite sides of the length of tubing as so positioned, means for moving said pinch members toward each other to pinch said tubing to valve-closing position and away from each other to permit said tubing to expand to valve-opening position, and means operable by said movement away from each other to apply mechanical force to the outer wall of said tubing to expand the same to said valve-opening position.

11. In a pinch type valve, the combination comprising a flexible tubing member, means for holding the respective ends of said tubing member in fluid-tight relationship to a conduit adapted to receive and discharge fluid therefrom and to a conduit adapted to supply fluid thereto, a pair of opposed, valve-closing pinch members mounted upon opposite sides of the length of tubing as so positioned, means for moving said pinch members toward each other to pinch said tubing to valve-closing position and away from each other to permit said tubing to expand to valve-opening position, and means operable by said movement away from each other to apply mechanical force to spaced portions at opposite side edges of the collapsed outer wall of said tubing to expand the same to said valve-opening position.

12. In a pinch type valve, the combination comprising a flexible tubing member, means for holding the respective ends of said tubing member in fluid-tight relationship to a conduit adapted to receive and discharge fluid therefrom and to a conduit adapted to supply fluid thereto, a pair of opposed, valve-closing pinch members mounted upon opposite sides of the length of tubing as so positioned, means for moving said pinch members toward each other to pinch said tubing to valve-closing position and away from each other to permit said tubing to expand to valve-opening position, a lever pivotally mounted upon one of said pinch members and having a portion adapted to abut and restore a collapsed edge of said tubing upon movement of said lever inwardly, and a link pivotally secured to said lever and to said other pinch member, whereby relative movement of said pinch members away from each other causes said movement of said lever into abutment with said collapsed edge of said tubing.

13. A pinch valve as defined in claim 12, in which a second and similar lever and link are pivotally interconnected with each other and with said respective pinch members in position to move said second lever into abutting and restoring relationship to the opposite collapsed edge of said tubing, upon said relative movement of said pinch members away from each other.

References Cited in the file of this patent

UNITED STATES PATENTS

| | | |
|---|---|---|
| 1,683,322 | Annis | Sept. 4, 1928 |
| 2,308,996 | Miller | Jan. 19, 1943 |
| 2,670,753 | Perkins | Mar. 2, 1954 |

FOREIGN PATENTS

| | | |
|---|---|---|
| 456,883 | Italy | of 1950 |
| 643,904 | Great Britain | of 1950 |